United States Patent
Nagayama (10) Patent No.: US 9,211,647 B2
(45) Date of Patent: Dec. 15, 2015

(54) PARALLEL LINK ROBOT

(71) Applicant: FANUC CORPORATION, Minamitsuru-gun, Yamanashi (JP)

(72) Inventor: Tomoaki Nagayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/016,118

(22) Filed: Sep. 1, 2013

(65) Prior Publication Data

US 2014/0060230 A1    Mar. 6, 2014

Related U.S. Application Data

(60) Provisional application No. 61/697,985, filed on Sep. 7, 2012.

(30) Foreign Application Priority Data

Aug. 31, 2012    (JP) .................................. 2012-191365

(51) Int. Cl.
  *B25J 18/02*    (2006.01)
  *B25J 9/00*    (2006.01)
  *B25J 9/16*    (2006.01)

(52) U.S. Cl.
  CPC ................ *B25J 18/02* (2013.01); *B25J 9/0051* (2013.01); *B25J 9/1623* (2013.01); *B25J 9/1692* (2013.01); *Y10S 901/27* (2013.01); *Y10T 74/20305* (2015.01)

(58) Field of Classification Search
  CPC ...... B25J 17/02; B25J 17/0266; B25J 9/1065; B25J 19/00; B25J 9/042; B25J 9/102; B25J 9/104; B25J 9/06; B25J 17/0275; B25J 9/046; B25J 15/00; B25J 15/0206; B25J 9/10

USPC ............... 74/490.01, 490.03, 490.05, 479.01, 74/480 R; 901/19, 23, 27, 36

See application file for complete search history.

(56) References Cited

U.S. PATENT DOCUMENTS 4,813,844 A * 3/1989 Torii et al. ..................... 414/730
4,841,762 A    6/1989 Hunter (Continued)

FOREIGN PATENT DOCUMENTS

CN    102049776 A    5/2011
EP    0166002 A1    1/1986

(Continued)

OTHER PUBLICATIONS

Office Action mailed Dec. 26, 2014, corresponding to Chinese patent application No. 201310390325.0.
Office Action dated Feb. 6, 2015, corresponding to German patent application No. 102013014273.3.

*Primary Examiner* — William Kelleher
*Assistant Examiner* — Jude Agendia
(74) *Attorney, Agent, or Firm* — Hauptman Ham, LLP (57) ABSTRACT

A parallel link robot includes a base part having actuators, a part movable with respect to the base part, link parts with first ends linked with the plurality of actuators rotatably around rotary shafts with respect to the base part and with other ends linked with the moving part, and fixtures attached to the base part to measure rotational positions of the link parts. The base part has reference flat surfaces, and the link parts have moving flat surfaces extended in parallel with respect to the rotary shafts. Positional relationships between the moving flat surfaces and the reference flat surfaces become predetermined positional relationships when the link parts rotate to reference positions for calibration of position. The fixtures have measuring devices arranged at measurement positions with known positional relationships with respect to the reference flat surfaces.

4 Claims, 7 Drawing Sheets

(56) References Cited

U.S. PATENT DOCUMENTS

| | | | |
|---|---|---|---|
| 5,714,674 A * | 2/1998 | Tsukuda et al. | 73/1.79 |
| 6,378,190 B2 * | 4/2002 | Akeel | 29/407.08 |
| 6,516,681 B1 * | 2/2003 | Pierrot et al. | 74/490.01 |
| 6,543,987 B2 * | 4/2003 | Ehrat | 414/735 |
| 7,386,408 B2 * | 6/2008 | Nishibashi et al. | 702/94 |
| 8,307,732 B2 * | 11/2012 | Kinoshita et al. | 74/490.01 |
| 2005/0107920 A1 | 5/2005 | Ban et al. | |
| 2008/0141813 A1 * | 6/2008 | Ehrat | 74/490.01 |
| 2011/0097184 A1 * | 4/2011 | Kinoshita et al. | 414/589 |
| 2011/0113915 A1 * | 5/2011 | Zhang et al. | 74/490.01 |

FOREIGN PATENT DOCUMENTS

| | | |
|---|---|---|
| JP | 60127985 A | 7/1985 |
| JP | 1-281891 A | 11/1989 |
| JP | 5-8185 A | 1/1993 |
| JP | H06-94114 B2 | 11/1994 |
| JP | 2009-255193 B2 | 11/2009 |
| JP | 2012-139761 A | 7/2012 |

\* cited by examiner

PARALLEL LINK ROBOT

RELATED APPLICATIONS

The present application is based on, and claims priority from, Japanese Application Number 2012-191365, filed Aug. 31, 2012, and U.S. Provisional Application No. 61/697,985, filed Sep. 7, 2012 the disclosure of which is hereby incorporated by reference herein in its entirety.

BACKGROUND OF THE INVENTION

1. Field of the Invention

The present invention relates to a parallel link robot which facilitates position calibration work.

2. Description of the Related Art

A δ-type parallel link robot is known in which three servo motors are arranged on a base, arms (links) are connected to output shafts of the servo motors, and an operating head (moving part) is displaced in the 3D space below the base by driving the arms. In this type of parallel link robot, in order to secure positional precision of the operating head, the arms have to be moved in advance to predetermined positions to calibrate the servo motors. In the parallel link robot which is described in Japanese Patent No. 4822558 (JP4822558B), origin pins are projected from motor brackets, reference pins are projected from the base ends of the arms, and the states where the reference pins abut against the origin pins are used as the origin positions of the links for carrying out the position calibration work.

However, in the parallel link robot which is described in JP4822558B, when driving the arms to make the reference pins abut against the origin pins, the arms are liable to be mistakenly driven too much. If the arms are driven too much, the abutting force between the reference pins and the origin pins becomes excessive and damage to the parallel link robot may be invited.

SUMMARY OF THE INVENTION

According to one aspect of the present invention, the parallel link robot includes: a base part having a plurality of actuators; a moving part movable with respect to the base part; a plurality of link parts with first ends linked with the plurality of actuators rotatably around rotary shafts with respect to the base part and with other ends linked with the moving part; and fixtures attached to the base part to measure rotational positions of the link parts. The base part has reference flat surfaces, and the link parts have moving flat surfaces extended in parallel with respect to the rotary shafts, wherein positional relationships between the moving flat surfaces and the reference flat surfaces become predetermined positional relationships when the link parts rotate to reference positions for calibration of position. The fixtures have measuring devices arranged at measurement positions with known positional relationships with respect to the reference flat surfaces, the measuring devices facing the moving flat surfaces when the link parts rotate to the reference positions and measuring distances between the reference flat surfaces and the moving flat surfaces.

BRIEF DESCRIPTION OF THE DRAWINGS

The object, features, and advantages of the present invention will become clearer from the following explanation of embodiments given with reference to the attached drawings, in which.

DETAILED DESCRIPTION

Figure 1:
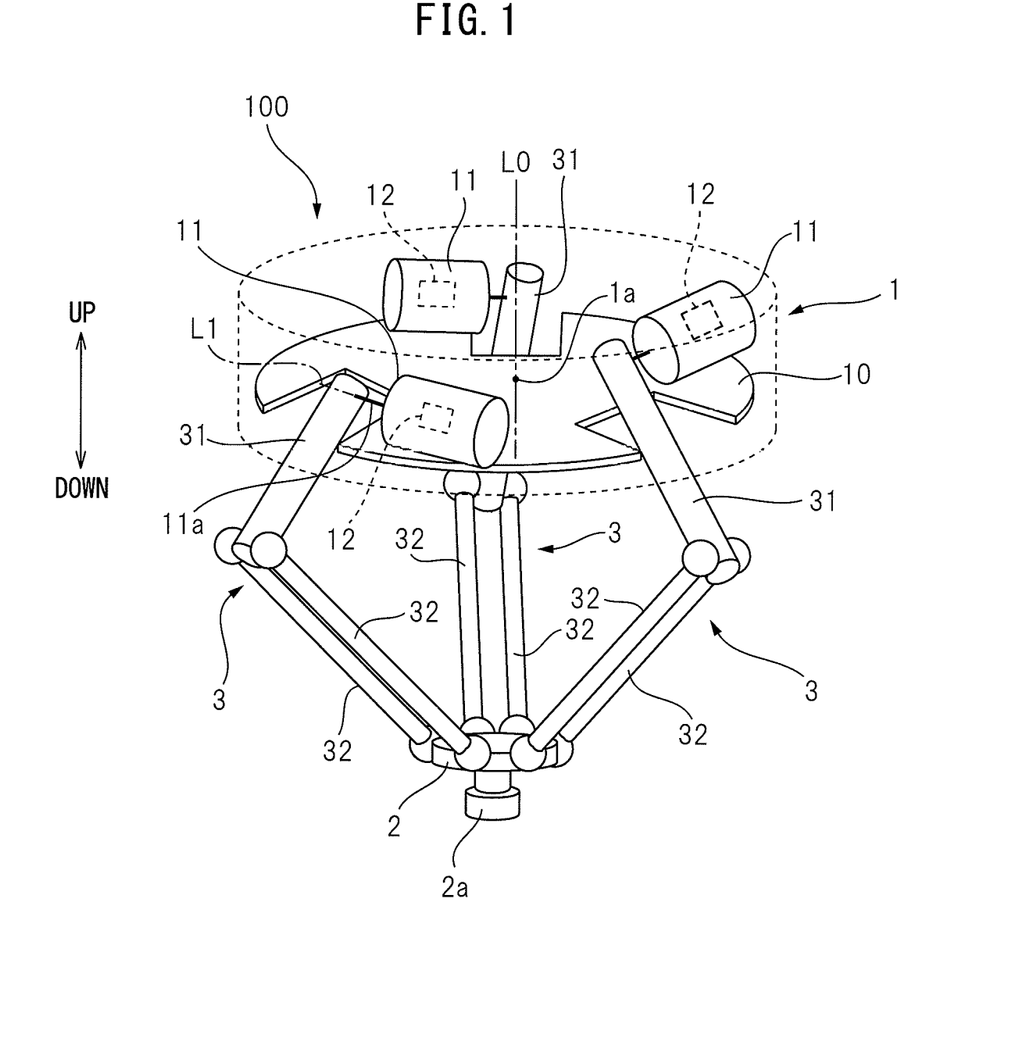
FIG. 1 is a perspective view which shows the schematic configuration of a parallel link robot according to an embodiment of the present invention.

Below, referring to FIG. 1 to FIG. 8, an embodiment of a parallel link robot according to the present invention will be explained. FIG. 1 is a perspective view which shows the schematic configuration of a parallel link robot 100 according to an embodiment of the present invention. As shown in FIG. 1, the parallel link robot 100 has a base part 1, a moving plate 2, and three link parts 3 which link the base part 1 and the moving plate 2. The base part 1 has a base part plate 10 and three servo motors 11 which are fastened to the base part plate 10 and drive the link parts 3.

The link parts 3 and the servo motors 11 are arranged at 120 degree intervals about a center point $1a$ at a center of the base part 1. The parallel link robot 100 is symmetrical in shape about the center point $1a$. Below, for convenience, as illustrated, the up-down direction is defined and the direction perpendicular to the up-down direction is called the "horizontal direction". Further, the direction extending radially from an axial line L0 which passes through the center point $1a$ and extends in the up-down direction is called the "diametrical direction", while the direction along the circumference of a circle centered about the axial line L0 is called the "circumferential direction". At the bottom part of the moving plate 2, a mounting part member $2a$ of a not shown end effecter is provided. The servo motors 11 are fastened to the top surface of the base part plate 10.

Each link part 3 has a drive link 31 and a pair of driven links 32 above and below. The drive link 31 extends from the base part 1 outward in the radial direction. One end of the drive link 31 is linked with an output shaft $11a$ of a servo motor 11, so the drive link 31 can rotate (can turn) about an extension of the output shaft $11a$, that is, an axial line L1, in a vertical plane including an axial line L0. The output shaft $11a$ of the servo motor 11 is linked with a speed reducer 13 (FIG. 2), and the drive link 31 is linked through the speed reducer 13 to the output shaft $11a$ of the servo motor 11. However, in FIG. 1, illustration of the speed reducer 13 is omitted and the drive link 31 is illustrated as being linked with the output shaft $11a$.

At the other end of each drive link 31, first ends of the pair of driven links 32 are linked through spherical roller bearings. The other ends of the pair of driven links 32 are linked through spherical roller bearings to the moving plate 2. Due to this, the servo motor 11 can drive the drive links 31 and the driven links 32 to rotate in the vertical planes to make the moving plate 2 displace to any position in the 3D space below the base part 1. The above parallel link robot 100 is called a δ-type parallel link robot.

Each servo motor 11 has a built in rotary detector 12 (encoder) which detects rotation of the servo motor 11 (amount of rotation). A signal from the rotary detector 12 is used as the basis to control the drive operation of the servo motor 11. The rotary detector 12 outputs a signal based on the origin position of the servo motor 11. However, along with the elapse of the work time or replacement of the motor etc., deviation occurs in the origin position. In this case, in order to secure the positional precision of the moving plate 2, position calibration work has to be used to calibrate each servo motor 11. In the position calibration work, the drive link 31 is rotated (turned) to a predetermined reference position and the position signal of the rotary detector 12 at that time is used to identify the origin position of the servo motor 11. In order to easily and precisely carry out the position calibration work, in the present embodiment, as explained below, a calibration use fixture 5 is attached to the base part 1.

Figure 2:
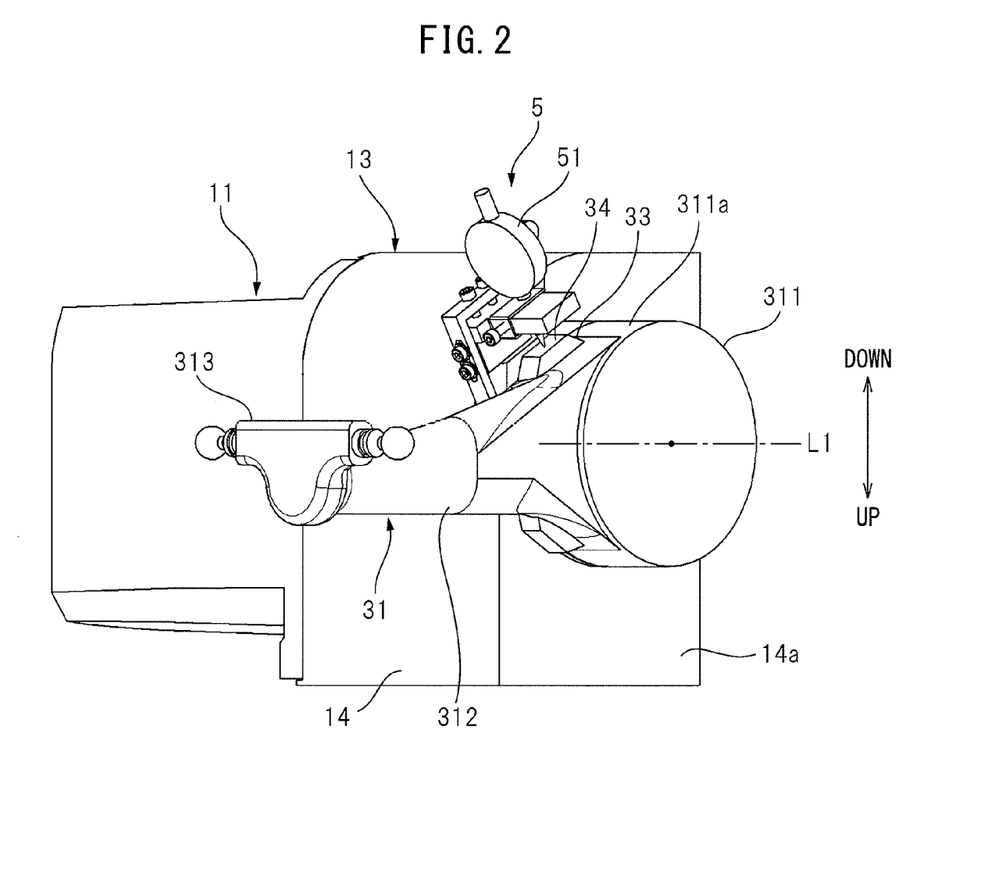
FIG. 2 is a perspective view which shows the configuration near a mounting part of a drive link of FIG. 1 and shows the state where a calibration use fixture is attached.
Figure 3:
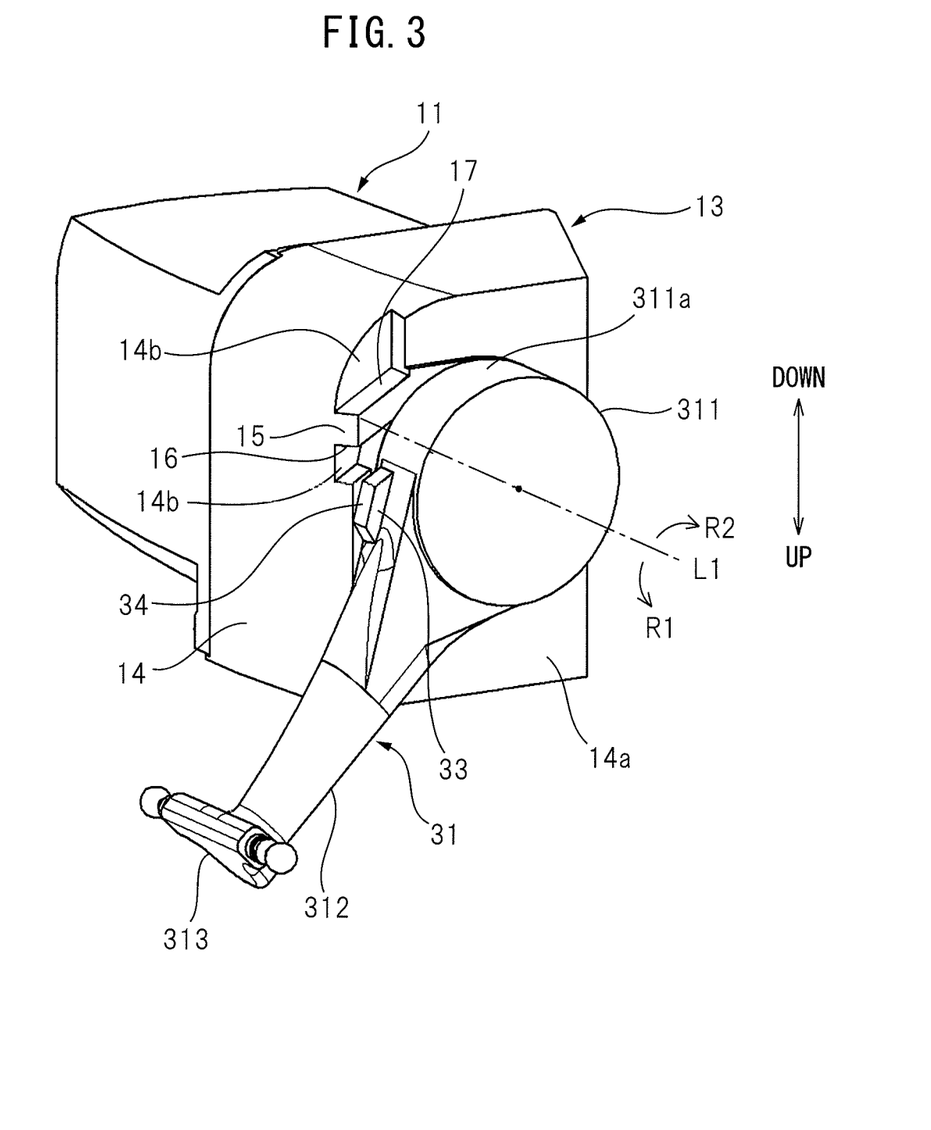
FIG. 3 is a perspective view which shows the configuration near a mounting part of a drive link of FIG. 1 and shows the state where a calibration use fixture is not attached.

FIG. 2 and FIG. 3 are perspective views which show the configuration near the mounting part of a drive link 31. In particular, FIG. 2 shows the state where a calibration use fixture 5 is attached. Although in FIG. 2 and FIG. 3, the configuration near the mounting part of one drive link 31 among the three drive links 31 is shown, the configurations near the mounting parts of the other drive links 31 are similar to FIG. 2 and FIG. 3. FIG. 2 and FIG. 3 show the configuration of FIG. 1 upside down.

As shown in FIG. 3, the drive link 31 has a rotary shaft part 311 which is linked with an output shaft 11a of a servo motor 11 (strictly speaking, a speed reducer 13), a link part 313 to which a pair of driven links 32 are linked, and a rod 312 which extends from the rotary shaft part 311 to the link part 313. The rotary shaft part 311 forms a columnar shape. The rod 312 extends from part of the outer circumferential surface 311a. An end face of the rotary shaft part 311 faces an end face 14a of the housing 14 of the speed reducer 13 from which the output shaft 11a projects. The drive link 31 is designed rotatably about the axial line L1 in the arrow R1 direction and R2 direction of FIG. 3. In FIG. 2 and FIG. 3, the postures of the drive link 31 differ. If rotating the drive link 31 from the posture of FIG. 3 in the R2 direction, the result becomes the posture of FIG. 2.

As shown in FIG. 3, at the outer circumferential surface 311a of the rotary shaft part 311, more specifically the base end of the rod 312 continued to the outer circumferential surface 311a, a projecting part 33 with a trapezoidal cross-section is provided. At the surface of the projecting part 33, a flat surface (moving flat surface 34) is formed in parallel to the axial line L1 and along a direction of extension of the rod 312.

At the end face 14a of the housing 14, below the output shaft 11a (axial line L1), a pair of top and bottom notches 14b are provided. Between these notches 14b, a block shaped projecting part 15 is formed inclined slightly with respect to the horizontal direction. At the top surface and bottom surface of the projecting part 15 (strictly speaking, the slanted top surface and the slanted bottom surface), the notches 14b form parallel flat surfaces 16 and 17. In particular, the lower side flat surface 17 forms a reference flat surface serving as the reference at the time of calibration of position. The reference flat surface 17 is formed so as to be positioned on the same plane as the moving flat surface 34 when making the drive link 31 rotate to a reference position (see FIG. 8). The "reference position" is the position serving as the reference of the drive link 31 at the time of calibration of position. When the drive link 31 is at the reference position, the servo motor 11 becomes the origin position.

As shown in FIG. 2, at the time of calibration of position, the projecting part of the housing 14 has a calibration use fixture 5 attached to it. The fixture 5 has a dial gauge 51. The front end part of the dial gauge 51 is made to abut against the moving flat surface 34 of the drive link 31. At this time, the indicated value is viewed while adjusting the rotational position of the drive link 31 to the reference position.

Figure 4:
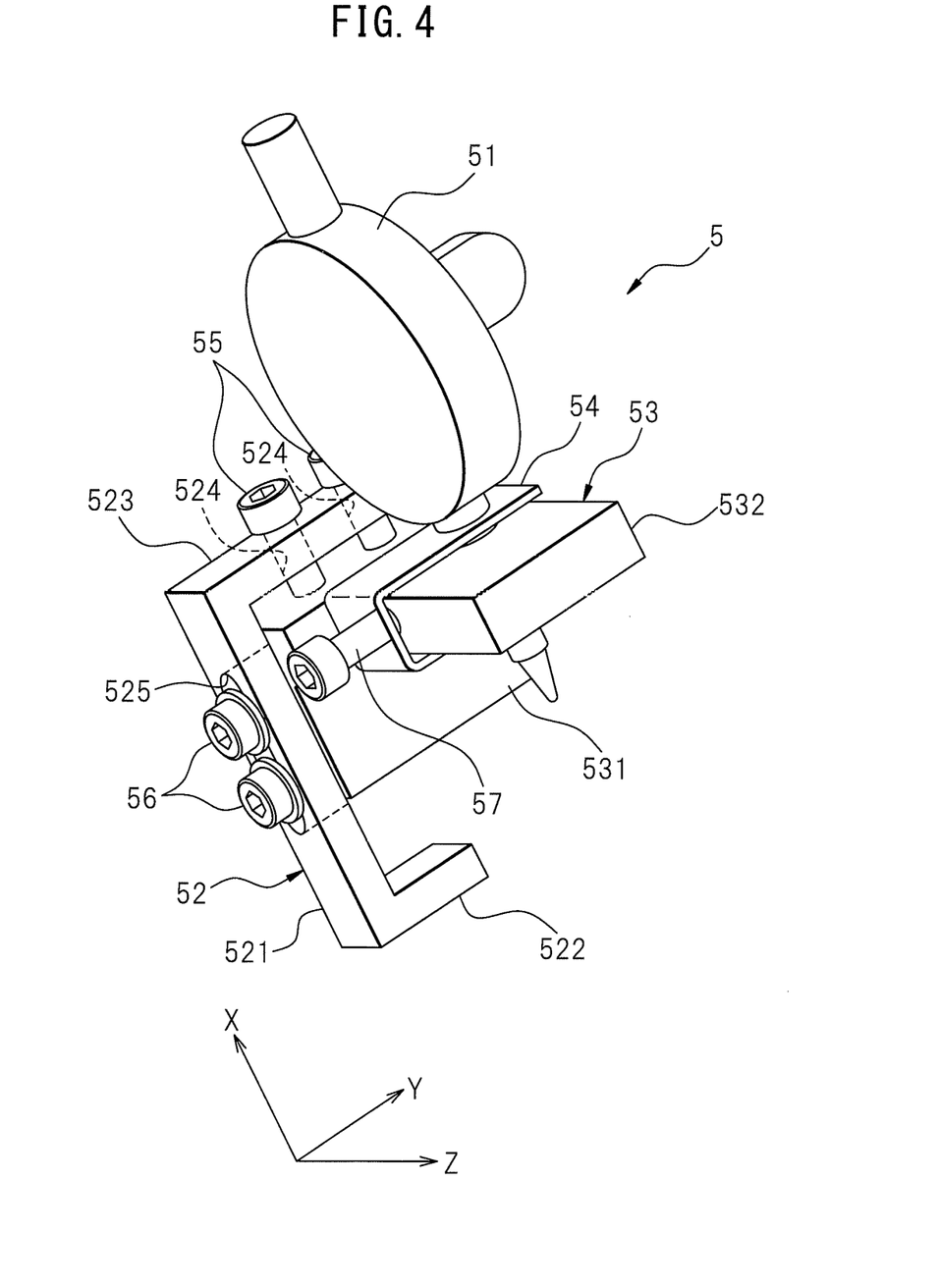
FIG. 4 is a perspective view which shows the configuration of a fixture of FIG. 2 alone.

FIG. 4 is a perspective view which shows the configuration of the fixture 5 alone. Below, for convenience, the directions perpendicular to each other as illustrated are defined as the "X-direction", "Y-direction", and "Z-direction". The configuration of the fixture 5 will be explained in accordance with these definitions.

As shown in FIG. 4, the fixture 5 has a frame member 52 which is attached to the projecting part of the housing 14, and a support member 53 which is attached to the frame member 52 and supports the dial gauge 51. The frame member 52 has an elongated vertical plate part 521 which extends in the X-direction and a pair of elongated horizontal plate parts 522 and 523 which extend in the X-direction from the two ends of the vertical plate part 521 in the Y-direction and exhibits a U-shape as a whole. One horizontal plate part 522 is inserted into the upper side notch 14b of the housing 14 (FIG. 7) and is shorter in Y-direction length than the other horizontal plate part 523. The horizontal plate part 523 is provided with a pair of screw holes 524 directed in the X-direction. Inside the screw holes 524, bolts 55 are screwed. The vertical plate part 521 is provided with an elongated hole 525 in the X-direction. A pair of flanged bolts 56 are run through the elongated hole 525.

Figure 5:
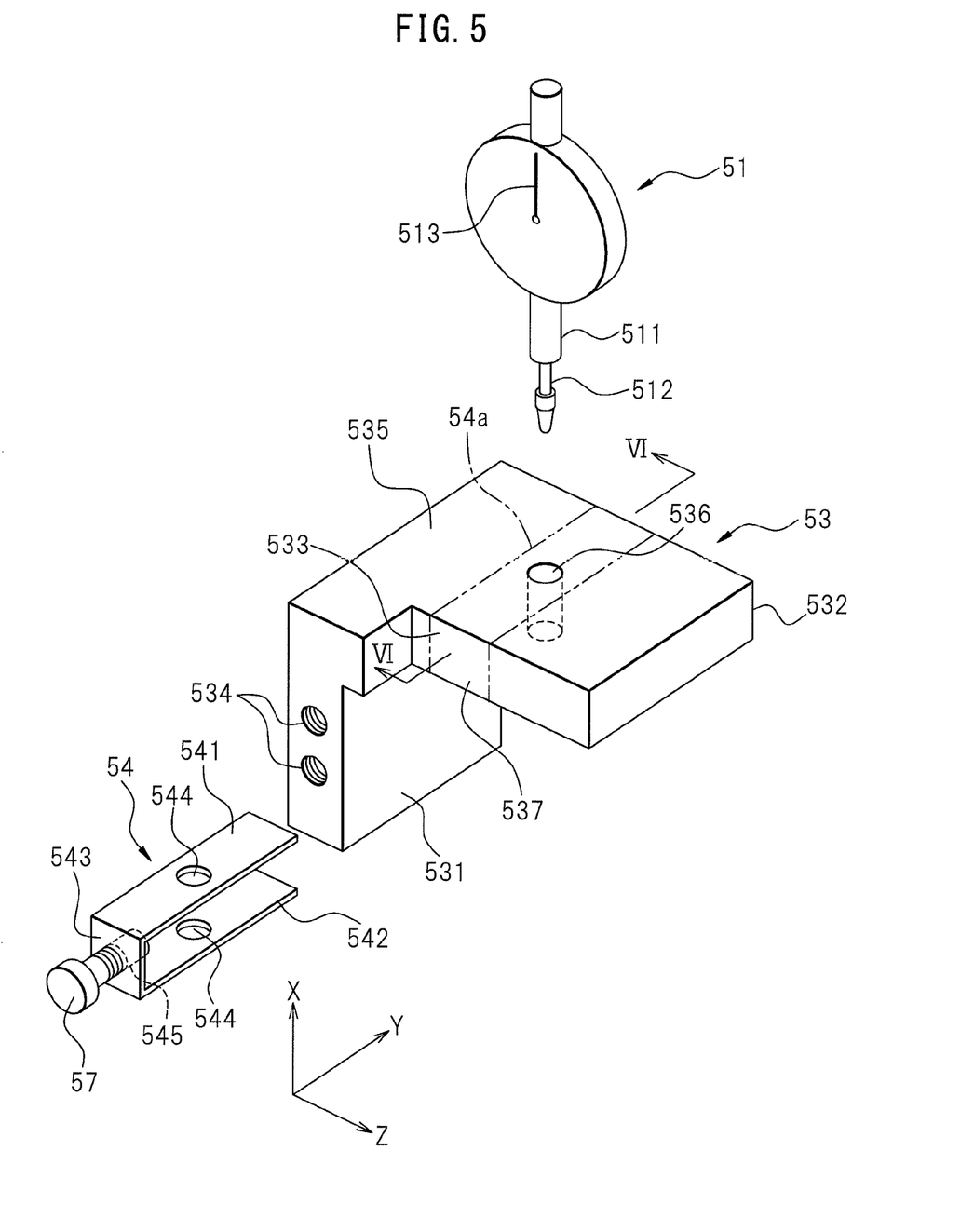
FIG. 5 is a perspective view which shows the configuration of a support member which forms part of the fixture of FIG. 4.

FIG. 5 is a perspective view which shows the configuration of the support member 53. The support member 53 has a rectangular shaped flat plate part 531 which extends in the XY direction and a rectangular shaped flat plate part 532 which extends from the X-direction end of the flat plate part 531 in the YZ direction and exhibits an L-shape as a whole. The flat plate part 532 is not a complete rectangular shape, is provided with a notch 533 in the Y-direction end, and strictly speaking forms an L-shape.

At the center part of the flat plate part 532, a through hole 536 through which the cylindrical part 511 of the dial gauge 51 passes is formed. The notch 533 side Y-direction end face of the flat plate part 531 is provided with a pair of screw holes 534 with which flanged bolts 56 are screwed. The X-direction end face of the flat plate part 531 where the flat plate part 531 and the flat plate part 532 intersect forms an abutting surface 535 which the front end parts of the bolts 55 abut against. The flat plate part 532 is fit with the gauge fastening member 54 at the region 54a so as to cover the through hole 536.

The gauge fastening member 54 has a pair of mutually parallel thin plate parts 541 and 542 and a thin plate part 543 which connects the thin plate parts 541 and 542 and forms a U-shape as a whole. The gauge fastening member 54 is attached from the notch 533 side toward the Y-direction so as to sandwich the flat plate part 532 by the pair of thin plate parts 541 and 542. The thin plate parts 541 and 542 are provided with through holes 544 through which the cylindrical part 511 of the dial gauge 51 passes at the same positions in the YZ direction. At the center of the thin plate part 543, a screw hole 545 is provided. A gauge fastening bolt 57 is screwed into the screw hole 545.

The dial gauge 51 has a moving part 512 which projects out from the cylindrical part 511. The moving part 512 can be raised and lowered with respect to the cylindrical part 511.

Figure 6:
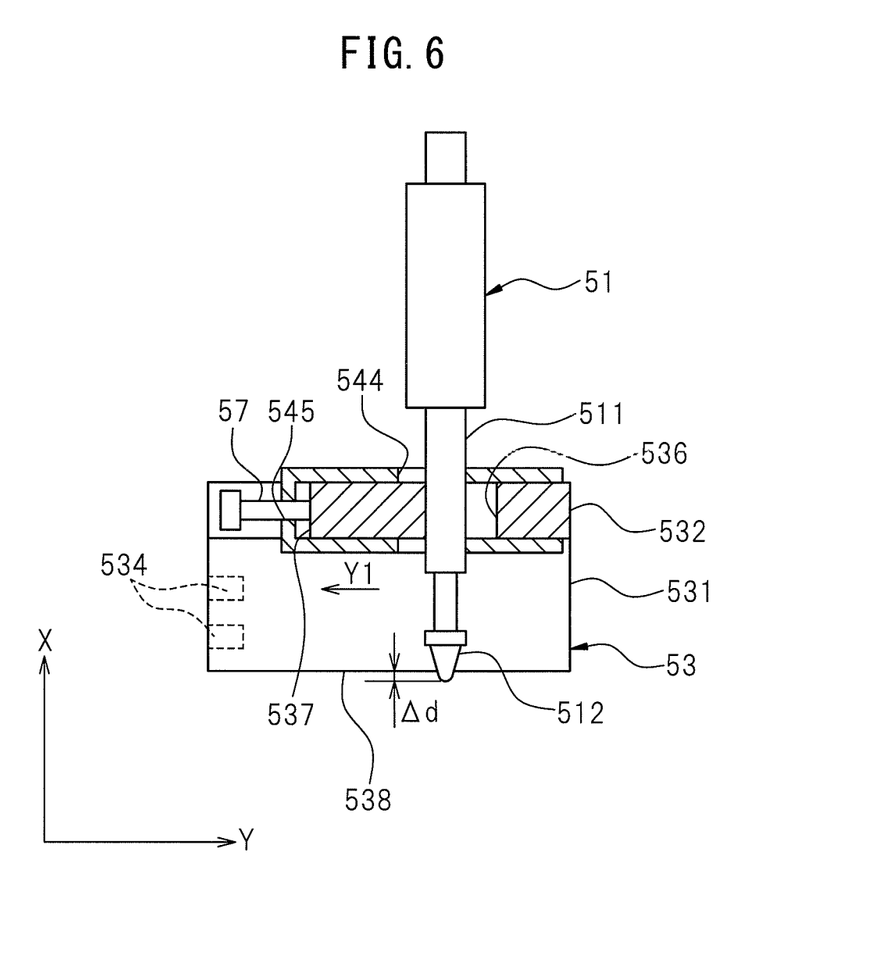
FIG. 6 is a cross-sectional view along the line VI-VI of FIG. 5.

Due to raising and lowering of the moving part 512, the indicated value of the graduations 513 changes. FIG. 6 is a cross-sectional view along the line VI-VI which shows the attached state of the dial gauge 51. When attaching the dial gauge 51, the gauge fastening member 54 is attached to the region 54a of the flat plate part 532 and, in that state, the cylindrical part 511 is inserted in the through holes 536 and 544. In order to facilitate this insertion, the diameters of the through holes 536 and 544 become larger than the outside diameter of the cylindrical part 511 of the dial gauge 51.

Next, the gauge fastening bolt 57 is fastened to make the front end part of the bolt 57 abut against the end face 537 of the flat plate part 532 at the notch 533 side. Due to this, as shown in FIG. 6, the gauge fastening member 54 moves in the Y-direction (Y1 direction of figure), the cylindrical part 511 is pushed against the inner circumferential surface of the through hole 544 of the gauge fastening member 54, and the dial gauge moves in the Y1 direction. If the cylindrical part 511 abuts against the inner circumferential surface of the through hole 536 of the flat plate part 532, movement of the cylindrical part 511 is prevented. Due to this, the cylindrical part 511 is gripped between the inner circumferential surface of the through hole 536 at one end side in the Y-direction and the inner circumferential surface of the through hole 536 at the other end side in the Y-direction whereby the dial gauge 51 is fastened to the support member 53.

At this time, the front end of the moving part 512 of the dial gauge 51 is made to stick out in the X-direction by a predetermined amount Δd (for example, 3 mm) from the end face 538 of the flat plate part 531 extending in the YZ direction (called "contact end face") by adjustment of the mounting position of the dial gauge 51 in the X-direction. In order to facilitate the positional adjustment of the dial gauge 51 in the X-direction, for example, the cylindrical part 511 is provided with a step part. By making this step part abut against the surface of the thin plate part 541 of the gauge fastening member 54, the dial gauge 51 can be positioned. After the position of the dial gauge 51 is roughly determined, the position of the front end part of the dial gauge 51 from the contact end face 538 is measured. The measured value may be set to a predetermined amount Δd. The predetermined amount Δd is smaller than the full scale of the dial gauge 51 and is, for example, about 50% of the full scale.

Figure 7:
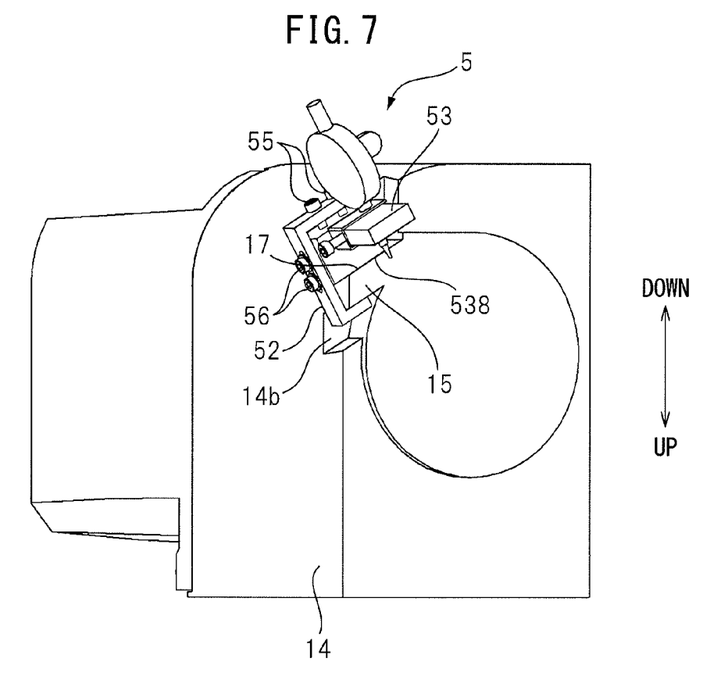
FIG. 7 is a perspective view which shows the attached state of the fixture of FIG. 2.

Next, the procedure of the position calibration work using a calibration use fixture 5 will be explained. When carrying out the position calibration work, first, due to rotation of the drive link 31, as shown in FIG. 3, the projecting part 33 of the drive link 31 is retracted to above the projecting part of the housing 14. Further, as explained above, the dial gauge 51 is positioned and attached to the support member 53, then the fixture 5 is attached to the projecting part of the housing 14. FIG. 7 is a perspective view which shows the attached state of the fixture 5. In FIG. 7, different from FIG. 2, illustration of the drive link 31 is omitted.

When attaching the fixture 5, first, the flanged bolts 56 are used to temporarily fasten the support member 53 to the frame member 52. That is, the support member 53 is attached to the frame member 52 in the state where the flanged bolts 56 can move along the elongated hole 525. In this state, the flat plate part 532 of the support member 53 is turned to the drive link 31 side, the horizontal plate part 522 of the frame member 52 is inserted to the upper side notch 14b, and the inside end face of the horizontal plate part 522 is made to abut against the flat surface 16 of the projecting part 15. Further, the bolts 55 are fastened to narrow the distance between the horizontal plate part 522 and the contact end face 538 of the support member 53, and the contact end face 538 is made to abut against the reference flat surface 17 of the projecting part 15.

As a result, due to the axial force of the bolts 55, the frame member 52 (horizontal plate part 522) and support member 53 (flat plate part 531) grip the projecting part 15. After this, the flanged bolts 56 are tightened to fasten the support member 53 to the frame member 52. By carrying out the above, attaching of the fixture 5 is completed. In the state where the fixture 5 is attached, the front end part of the dial gauge 51 (front end of moving part 512) faces the outer circumferential surface 311 of the rotary shaft part 311. At this time, the reference flat surface 17 of the housing 14 and the contact surface 538 of the fixture 5 are positioned on the same plane, so the front end part of the dial gauge 51 sticks out from the reference flat surface 17 by a predetermined amount Δd. The position of the dial gauge 51 in this case is called the "measurement position".

In this state, the drive link 31 is gradually made to rotate in the R2-direction of FIG. 3. Due to rotation of the drive link 31, the moving flat surface 34 of the projecting part 33 approaches the dial gauge 51. As shown in FIG. 2, if the moving flat surface 34 contacts the front end part of the dial gauge 51, the moving flat surface 34 pushes in the moving part 512 whereby the indicated value of the graduation 513 of the dial gauge 51 changes. If viewing the graduation 513 while rotating the drive link 31 in the R2 direction and the indicated value becomes a predetermined value Δd, the rotation of the drive link 31 is stopped.

If making the drive link 31 rotate too much in the R2 direction and the indicated value exceeds the predetermined value Δd, the drive link 31 is made to rotate in the opposite direction (R1 direction of FIG. 3) to make the indicated value match with the predetermined value Δd. Since there is extra leeway in the amount by which the dial gauge 51 is pushed in, damage to the fixture 5 can be prevented even if making the drive link 31 rotate too much in the R2 direction. The indicated value changes in accordance with the distance between the reference flat surface 17 and the moving flat surface 34. In the state where the indicated value becomes the predetermined value Δd, the reference flat surface 17 and the moving flat surface 34 are positioned on the same plane with zero distance between the two and the drive link 31 becomes the reference position.

At this time, the operator uses a switch operation etc. to teach the control circuit (not shown) that the drive link 31 is at the reference position. Due to this, the control circuit reads the position signal which is output from the rotary detector 12 and identifies the origin position of the servo motor 11. The above position calibration work is, for example, carried out for all of the servo motors 11. When the position calibration work ends, the bolts 55 and 56 are loosened and the fixture 5 is detached from the housing 14.

Figure 8:
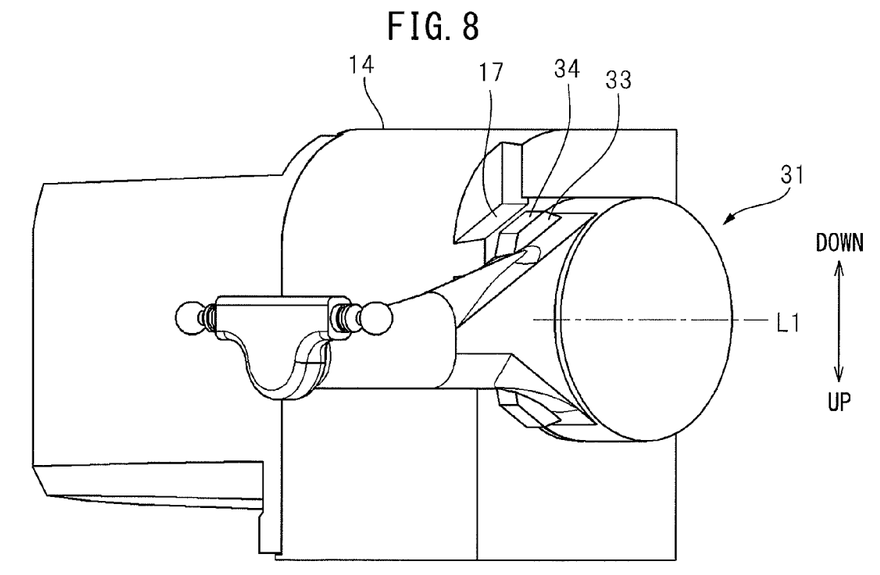
FIG. 8 is a view which shows an example of position calibration work without using the fixture of FIG. 2.

Above, although the position calibration work using the fixture 5 will be explained, it is also possible to carry out the position calibration work without using the fixture 5. FIG. 8 is a view which explains the position calibration work which is carried out without using the fixture 5. In this case, while visually checking the positional relationship between the reference flat surface 17 and the moving flat surface 34, as shown in FIG. 8, the drive link 31 is made to rotate so that the reference flat surface 17 and the moving flat surface 34 are positioned on the same plane. Further, the origin position of the servo motor 11 is identified by the position signal which is output from the rotary detector 12 when the reference flat surface 17 and the moving flat surface 34 are positioned on the same plane, that is, when the drive link 31 is made to move to the reference position.

In this case, since the reference flat surface 17 is formed at the end part of the housing 14 at the drive link 31 side and since the reference flat surface 17 and moving flat surface 34 are arranged aligned in the rotary shaft L1 direction, it is possible to easily judge if the reference flat surface 17 and the moving flat surface 34 are on the same plane. It is possible to place a flat plate shaped gauge on the flat surfaces 17 and 34 so as to straddle the reference flat surface 17 and the moving flat surface 34 and compare the clearances between the gauge and the flat surfaces 17 and 34 to judge if the flat surfaces 17 and 34 are on the same plane.

According to the present embodiment, the following function effects can be exhibited.

(1) The parallel link robot 100 of the present embodiment is provided with a base part 1 which has three servo motors 11, moving plate 2 which can move with respect to the base part 1, three link parts 3 with first ends linked with the servo motors 11 to be able to rotate around rotary shafts L1 with respect to the base part 1 and with other ends linked with the moving plate 2, and fixtures 5 for position calibration use which are attached to the base part 1 to measure rotational positions of the link parts 3 (drive links 31). The base part 1 has reference flat surfaces 17, the link parts 3 have moving flat surfaces 34 which become the same plans as the reference flat surfaces 17 when rotating to reference positions for position calibration, and the fixtures 5 have dial gauges 51 which face the moving flat surfaces 34 when the link parts rotate to the reference positions. The drive links 31 are rotated to the reference positions where the two flat surfaces 17 and 34 are on the same plane while measuring the distances between the reference flat surfaces 17 and the moving flat surfaces 34 by the dial gauges 51. Due to this, when making the drive links 31 rotate to the reference positions, even if the drive links 31 are rotated too much, the dial gauges 51 need only be pushed in a bit more (however, less than full scale). Therefore, the fixtures 5 etc. can be kept from being damaged and the position calibration work can be easily carried out. That is, the drive links 31 are allowed to be rotated past the reference positions, so at the time of position calibration work, the rotational speeds of the drive links 31 in the R2 direction can be increased and the efficiency of the position calibration work is raised.

(2) When attaching the dial gauges 51 to the fixtures 5 and rotating the drive links 31 to the reference positions, the dial gauges 51 are arranged so that the front end parts of the dial gauges 51 strike the moving flat surfaces 34 and dial gauges 51 are pushed in by predetermined amounts Δd. Due to this, it is possible to make the drive links 31 rotate to the reference positions while watching the graduations 513 of the dial gauges 51 and it is possible to carry out the position calibration work precisely. Further, by using the dial gauges 51, it is possible to carry out the position calibration work by an inexpensive configuration.

(3) The reference flat surfaces 17 and the moving flat surfaces 34 are formed so as to be positioned on the same planes when the drive links 31 rotate to the reference positions. Due to this, even when there are no fixtures 5, the drive links 31 can be made to easily move to the reference positions and it is possible to carry out position calibration work not using the fixtures 5.

(4) The contact flat surfaces 538 of the support members 53 which support the dial gauges 51 are made to abut against the reference flat surfaces 17 to attach the fixtures 5 to the projecting parts 15. Due to this, the amounts of projection Δd of the front end parts of the dial gauges 51 from the contact flat surfaces 538 become equal to the amounts of projection Δd from the reference flat surfaces 17, and thus the positions of the dial gauges 51 with respect to the reference flat surfaces 17 can be easily adjusted.

(5) By fastening the bolts 55 and 56, the frame members 52 and the end faces of the support members 53 grip the projecting parts 15 and the fixtures 5 are attached to the projecting parts 15 in a detachable manner. Therefore, by detaching the fixtures 5 from the projecting parts 15 other than at the time of the position calibration work, the fixtures 5 can be prevented from interfering with the operation of the parallel link robot and the mounting positions of the fixtures 5 can be freely set regardless of the range of operation of the parallel link robot 100. For example, it is possible to set the reference positions of the drive links 31 within the range of normal operation of the parallel link robot 100. Due to this, it is possible to attach the fixtures 5 to all of the drive links 31, then simultaneously make all of the drive links 5 move to the reference positions. Therefore, the calibration of positions of all of the servo motors 11 can be carried out at one time and the position calibration work becomes much easier.

(6) The frame members 52 and the support members 53 grip the projecting parts 15 to attach the fixtures 5 to the housings 14, so there is no need to form bolt holes in the housings 14 for mounting the fixtures and the fixtures 5 are easily attached.

(Modifications)

In the present embodiment, the fixtures 5 which have the dial gauges 51 are fastened to the housings 14, the dial gauges 51 are used to measure the rotational positions of the link parts 3 (drive links 31), and the drive links 31 are made to rotate to the reference positions at the time of the position calibration work. However, the configuration of the fixtures 5 which measure the rotational positions of the drive links 31 is not limited to this. For example, it is also possible to provide laser range finders instead of the dial gauges 51 as the measuring devices and use the laser range finders to measure the distances between the reference flat surfaces 17 and the moving flat surfaces 34. That is, so long as having measuring devices which face the moving flat surfaces 34 when the drive links 31 rotate to the reference positions and measure the distances between the reference flat surfaces 17 and the moving flat surfaces 34, the fixtures may be configured in any way. In the above embodiment, in the mounted states of the fixtures 5, the front end parts of the dial gauges 51 are projected out from the reference flat surfaces 17 by the predetermined amounts Δd. However, as long as they are arranged at measurement positions where the positional relationships with the reference flat surfaces 17 are known, the arrangement of the measuring devices is not limited to the one explained above.

In the above embodiment, the moving links 31 are provided with projecting parts 33 and the projecting parts 33 are formed with moving flat surfaces 34 on their surfaces. However, so long as they are extended in parallel with respect to the rotary shaft L1 and result in predetermined positional relationships with respect to the reference flat surfaces 17 when the moving links 31 rotate to the reference positions, the configuration of the moving flat surfaces 34 is not limited to this. Therefore, the moving flat surfaces 34 may be formed so that the moving flat surfaces 34 are positioned on the flat surfaces different from the reference flat surfaces 17 at the time of the position calibration work. For example, at the reference positions, the moving flat surfaces 34 may be positioned upward or downward by predetermined amounts from the reference flat surfaces 17. In the above embodiment, although the projecting parts of the housings 14 are formed with reference flat surfaces 17 and the reference flat surfaces 17 are used to attach the fixtures 5 to the projecting parts 15, the fixture mounting parts are not limited in configuration to the one explained above. It is also possible to provide fixture mounting parts at the base part plates 10 instead of the housings 14. In the above embodiment, the reference flat surfaces 17 are formed so as to extend in parallel with the axial lines L1 of the drive links 31. However, it may also be formed inclined with respect to the axial lines L1. In the above embodiment, although the support members 53 which support the dial gauges 51 and the frame members 52 which surround parts of the support members 53 grip the projecting parts of the housing 14 and the contact flat surfaces 538 of the support members 53 are made to contact the reference flat surfaces 17 to attach the fixtures 5 to the projecting parts 15, the support parts which support the measuring devices is not limited in configuration to the one explained above.

In the above embodiment, although servo motors 11 are used as the actuators for driving the link parts 3, other actuators may also be used. Although three link parts 3 which have the drive links 31 and pairs of driven links 32 are provided to form the parallel link robot 100, so long first ends are linked with the plurality of actuators rotatably around rotary shafts L1 with respect to the base parts 1 and with other ends linked with the moving plates 2, the configuration of the plurality of link parts 3 is not limited to the one explained above. The configuration of moving parts comprised of the moving plates 2 is not limited to the one explained above. In the above embodiment, although the fixtures 5 are attached to the base part 1 by the bolts 55 and 56 in a detachable manner, so long as the fixtures 5 are attached to positions which do not interfere with normal operation of the robot 100 (outside of range of normal operation), the fixtures 5 may also be fixedly attached to the base part 1. It is also possible to combine the above embodiment and one or more of the above modifications.

According to the present invention, it is possible to prevent damage to the parts which form the parallel link robot even when the link parts are driven too much when making the link parts rotate to the reference positions for calibration of position.

While the present invention has been described with reference to the preferred embodiments thereof, it will be understood, by those skilled in the art, that various changes and modifications may be made thereto without departing from the scope of the appended claims.

The invention claimed is:

1. A parallel link robot, comprising:
a base part having a plurality of actuators;
a moving part movable with respect to the base part;
a plurality of link parts with first ends linked with the plurality of actuators rotatably around rotary shafts with respect to the base part and with other ends linked with the moving part; and
fixtures attached to the base part to measure rotational positions of the link parts,
wherein the base part has reference flat surfaces, wherein the link parts have moving flat surfaces extended in parallel with respect to the rotary shafts, wherein positional relationships between the moving flat surfaces and the reference flat surfaces become predetermined positional relationships when the link parts rotate to reference positions for calibration of position,
wherein the fixtures have measuring devices arranged at measurement positions with known positional relationships with respect to the reference flat surfaces, the measuring devices facing the moving flat surfaces when the link parts rotate to the reference positions and measuring distances between the reference flat surfaces and the moving flat surfaces, and
wherein the reference flat surfaces and the moving flat surfaces are formed so as to be positioned on the same planes as each other when the link parts rotate to the reference positions.

2. The parallel link robot according to claim 1, wherein the measuring devices are dial gauges and are arranged so that front end parts of the dial gauges abut against the moving flat surfaces and are pushed in by predetermined amounts when the link parts rotate to the reference positions.

3. The parallel link robot according to claim 2, wherein the fixtures have support parts attached to contact the reference flat surfaces in a detachable manner to support the measuring devices.

4. The parallel link robot according to claim 1, wherein the fixtures have support parts attached to contact the reference flat surfaces in a detachable manner to support the measuring devices.

* * * * *